Jan. 1, 1952  W. H. KITTO  2,580,554
ELECTRIC TOASTER
Filed March 18, 1947  4 Sheets-Sheet 1

INVENTOR.
William H. Kitto
BY
Harry S. Demarre
ATTORNEY.

Jan. 1, 1952     W. H. KITTO     2,580,554
ELECTRIC TOASTER

Filed March 18, 1947     4 Sheets-Sheet 2

INVENTOR.
William H. Kitto
BY
Harry S. DeMarsh
ATTORNEY.

Jan. 1, 1952 W. H. KITTO 2,580,554
ELECTRIC TOASTER

Filed March 18, 1947 4 Sheets-Sheet 3

INVENTOR.
William H. Kitto
BY
Harry S. Durasse
ATTORNEY.

Jan. 1, 1952            W. H. KITTO            2,580,554
ELECTRIC TOASTER

Filed March 18, 1947                            4 Sheets-Sheet 4

INVENTOR.
William H. Kitto
BY
Harry S. Demarest
ATTORNEY.

Patented Jan. 1, 1952

2,580,554

UNITED STATES PATENT OFFICE 2,580,554

ELECTRIC TOASTER

William H. Kitto, Chicago, Ill., assignor to The Hoover Company, North Canton, Ohio, a corporation of Ohio Application March 18, 1947, Serial No. 735,328

9 Claims. (Cl. 99—334)

The present invention relates to electric bread toasters and more particularly to a thermal timing mechanism for timing the duration of the toasting interval whereby the operator may obtain toast cooked exactly as he or she desires.

More particularly according to this invention a thermal timer of the "heat-up-cool-off" type is provided. That is the toasting interval is determined by the time it takes to heat a thermally responsive element to a predetermined temperature plus the time it takes the thermally responsive element to cool again after being heated.

Thermal timers of this general nature are known in the art but have the disadvantage that they are complicated and unreliable in operation. According to the present invention a single latch is provided which latches the toast carriers in toasting position when the carriers are moved to toasting position and is moved to a second position when the thermally responsive element moves to hot position while maintaining the toast carriers in latched position. The movement of the latch moves it into a position to be actuated by movement of the thermally responsive element to cold position to release the toast carriage for movement to ejecting position.

Simultaneously with the movement of the latch by movement of the thermally responsive element to hot position the auxiliary heater for the thermally responsive element is also deenergized to permit the thermally responsive element to cool and complete the timed interval.

Other objects and advantages of the invention will become apparent as the description proceeds when taken in connection with the accompanying drawings, in which.

Figure 1:
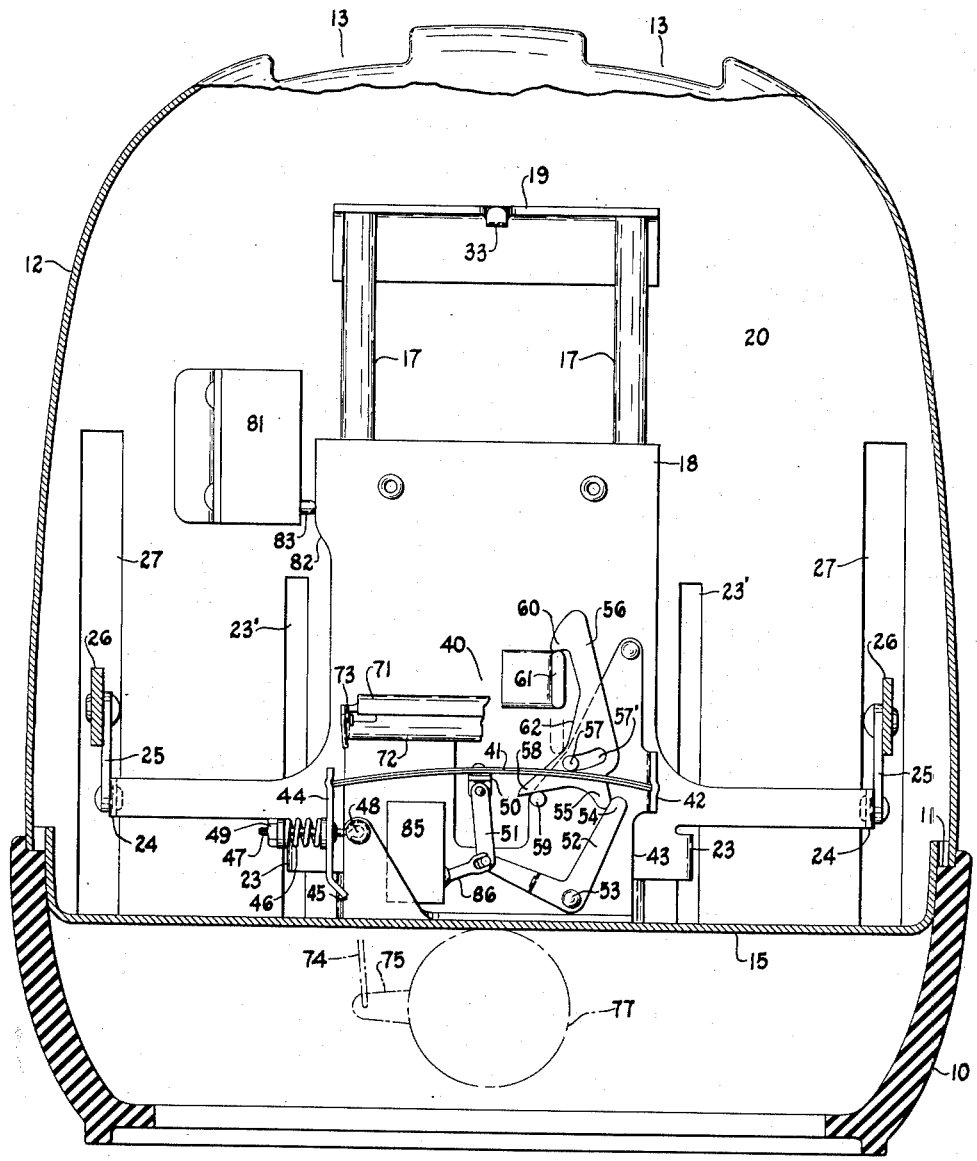
Figure 1 is a front cross-sectional view of a toaster with the timing mechanism of this invention applied thereto.
Figure 2:
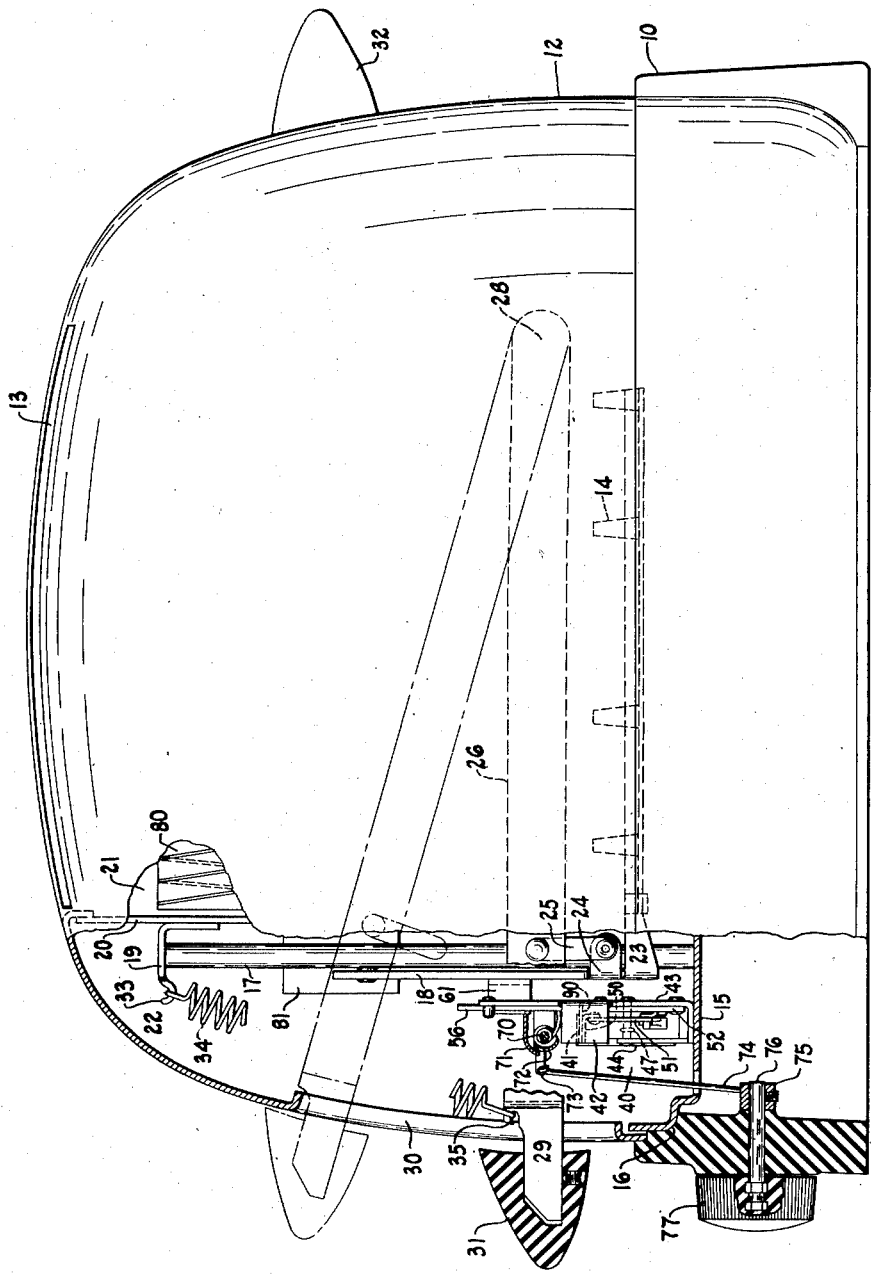
Figure 2 is a side view of a toaster with the timing mechanism of this invention applied thereto having parts broken away to better show the details of the timing mechanism.

Referring to the drawings a plastic base 10 is provided for supporting the entire toaster and holding the mechanism in assembled relationship. Supported on a ledge 11 of base 10 is an appearance housing 12 which houses the entire mechanism including the toasting mechanism and the timer. The appearance housing is provided with a plurality of bread receiving openings 13 through which bread is inserted for toasting purposes. Immediately below the openings 13 are bread carriers 14 which permit bread slices to extend through the openings 13 when in loading or ejecting position.

A base plate 15 is supported on a second ledge 16 is base 10 and forms the support for the entire mechanism within the appearance housing 12.

Rigidly mounted on base plate 15 are a pair of vertically extending posts 17 which form guides for the carriage plate 18 in a manner well known in the art. At their upper ends the posts 17 are rigidly attached to a bracket 19 secured to a dividing plate 20 which divides the toaster into a toasting chamber or oven 21 and a mechanism compartment 22. The bread carriers 14 are rigidly attached to lugs 23 extending rearwardly from the carriage plate 18. Slots 23' are provided in plate 20 to permit movement of the bread carriers 14.

Immediately above and extended outwardly from the lugs 23 are a pair of lugs 24, extending rearwardly from the carriage plate 18, to which are pivoted the lower ends of links 25. The upper ends of links 25 are pivoted to a pair of arms 26 which form a part of the manual means for moving the carriers 14 to toasting position. The arms 26 extend through slots 27 in the dividing plate 20 and at their rear ends are pivoted to the sides of the toasting chamber as shown at 28. At their front ends the arms are extended forwardly at 29 so as to extend through a slot 30 in the appearance housing 12. Attached to the forwardly extending portions 29 of arms 26 is a manipulating handle 31 by which the toasting operation is initiated. Secured to the opposite end of the appearance housing 12 from handle 31 is a rigid handle 32 which with the handle 31 forms a carrying handle to move the toaster from place to place.

Extending forwardly from the bracket 19 is a hook 33 which forms the upper anchorage for a tension spring 34, secured at its lower end to hook 35 on the forwardly extended portions 29 of arms 26. The spring 34 serves to bias the carriage 18 and associated parts to upward or toast ejecting position.

Secured to the base plate 15 within the mechanism compartment is a timing mechanism generally indicated by the reference numeral 40.

The timing mechanism comprises a bimetallic element 41 supported at one end by a lug 42 extending from a bracket 43 rigidly secured to base plate 15. The opposite end of bimetal 41 is supported by a link 44 pivoted to the end of bracket 43 as at 45. A compressive force is applied to the ends of bimetal 41 by a compression spring 46. An eye bolt 47 is anchored to the bracket 43 at 48 and extends through the spring 46. An adjusting nut 49 threaded to the outer end of bolt 47 forms a factory adjustment whereby the pressure applied to the ends of bimetal 41 may be adjusted.

Secured to the central portion of bimetal 41 is an L-shaped bracket 50. Pivoted to the bracket 50 is a link 51 which is pivoted at its lower end to a bell crank 52. The bell crank 52 is pivoted to bracket 43 at 53. The end 54 of bell crank 52 cooperates with the tail 55 on latch lever 56 in a manner which will be more fully explained hereinafter.

The latch lever 56 is mounted on bracket 43 by a pin and slot connection 57, 57'. The end 58 of latch lever 56 cooperates with a stop 59 to limit its counter-clockwise movement. The upper end of latch lever 56 has a hooked portion 60 which engages over lug 61 extending forwardly from carriage plate 18 to latch the carriage plate 18 and carriers 14 in toasting position. The latch lever 56 also has a cam portion 62 which cooperates with lug 61 to move the latch lever 56 to latching position as will be explained hereinafter.

Mounted on the bracket 43 immediately above the bimetal 41 is an auxiliary heater 70 for applying heat to the bimetal 41. A reflector 71 is mounted immediately above the heater 70 to reflect heat rays from the heater 70 to the bimetal 41. In order to adjust the amount of heat radiated from the auxiliary heater 70 to the bimetal 41 a movable shield 72 is provided. The shield 72 is provided with a crank arm 73 connected by link 74 to a crank arm 75 on shaft 76 extending through base 10. A manipulating knob 77 is connected to the shaft 76 on the outside of base 10 whereby the quantity of heat radiated from the auxiliary heater 70 to the bimetal 41 may be manually adjusted in order to adjust for light, dark or medium toast.

Main heaters 80 are positioned on opposite sides of bread carriers 14 within the toasting compartment or oven 21. These heaters are energized when the carriage 18 is moved to toasting position by the switch 81 rigidly attached to the dividing plate 20. A cam 82 on carriage plate 18 contacts the operating plunger 83 of switch 81 when the carriage plate 18 is moved downwardly to initiate a toasting operation. The switch 81 opens automatically when pressure on the plunger 83 is released.

A switch 85 is provided for energizing and deenergizing the auxiliary heater 70 for the bimetal 41. When the bimetal 41 is in its cold position, as in Fig. 1 the switch 85 is closed and the auxiliary heater 70 is energized. When the bimetal 41 moves to its hot position the link 51 acting through lever 86 opens the switch 85 to deenergize the auxiliary heater 70.

Operation

The operator adjusts the knob 77 for light, medium or dark toast as desired. It will be understood that movement of the shield 72 to a position between the auxiliary heater 70 and the bimetal 41 will lengthen the toasting period while the reverse movement will shorten the toasting period. Thus, if dark toast is desired, the shield 72 will be moved to a maximum extent between the auxiliary heater 70 and the bimetal 41 so that the bimetal will heat up slowly and prolong the toasting interval. If light toast is desired the shield 72 will be moved entirely from between the heater 70 and the bimetal 41. This will cause the bimetal to be heated quickly and shorten the toasting interval.

The operator will then insert bread slices through the openings 13 so as to rest on carriers 14. The manipulating knob 31 will then be grasped and moved to its lowermost position.

Figure 4:
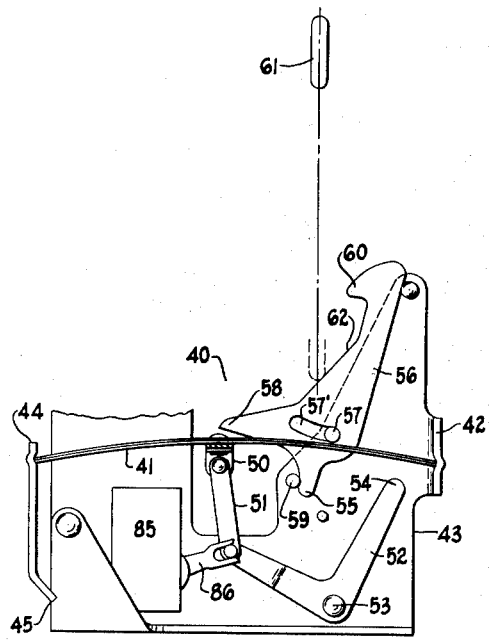
Figure 4 is a detailed view of the timing mechanism showing the relationship of the parts with the bimetal cold and the toast carriers in upper ejecting position.

Figure 4 shows the parts in the position which they occupy before the carriers 14 are moved to toasting position. Movement of the knob 31 to lower position will cause movement of the carriage 18 to lower position. The lug 61 on carriage 18 will contact cam surface 62 on latch lever 56 to create a force to push the lower end of latch lever 56 to the right as viewed in Figure 4 so that the pin 57 will be positioned in the left hand end of slot 57' as in Fig. 1. Continued movement of the lug 61 downwardly will cause the latch lever 56 to pivot in a counterclockwise direction with the pin 57 as a fulcrum so as to assume the position of Figure 1. In this position the hooked end 60 of latch lever 56 will overlie the lug 61 on the carriage plate 61. At the same time the cam 82 on carriage plate 18 will contact the pin 83 of switch 81 and simultaneously energize the main heaters 80 and the auxiliary heater 70.

Upon release of the handle 31 the carriage plate 18 will move upwardly slightly to the position of Fig. 1 until the lug 61 engages the hook 60 of latch 56 which will arrest further upward movement and the toasting operation will proceed.

Figure 5:
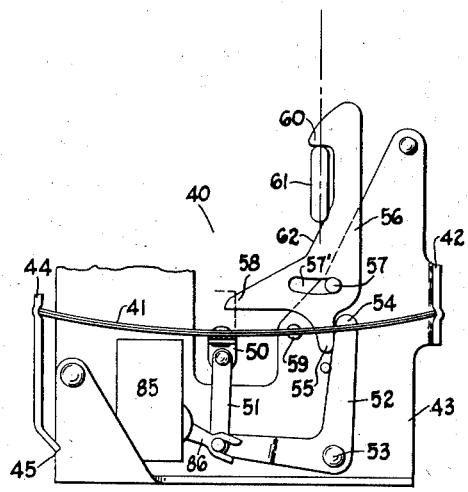
Figure 5 is a detailed view of the timing mechanism showing the relationship of the parts with the bimetal in hot position and the carriers latched in toasting position.
Figure 6:
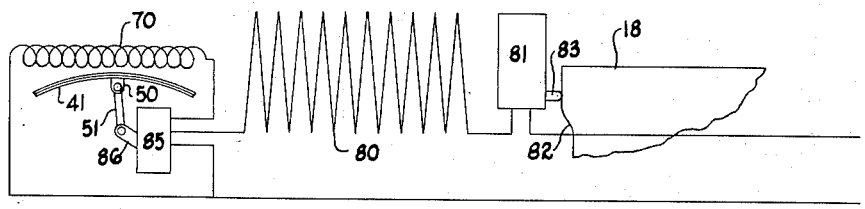
Figure 6 is a wiring diagram showing how the parts are electrically connected.

Heat radiated directly from the auxiliary heater 70 to the bimetal 41 and reflected thereto by the reflector 71 will heat the bimetal 41 causing it to move downwardly slowly until it reaches its dead center position at which time it will snap to its downwardly bowed position of Fig. 5 under the influence of spring 46.

This will open switch 85 by movement of the link 51 and the arm 86 and deenergize the auxiliary heater 70 while the main heaters 80 remain energized. At the same time the end 54 of bell crank 52 will engage the tail 55 of latch 56 and move its lower end to the left as viewed in Fig. 1 so that the pin 57 is at the right hand end of slot 57' as shown in Fig. 5. The slope of the slot 57' and the distance between the hook 60 and the pin 57 is such that the frictional resistance between the hook 60 and the lug 61 will permit the above movement.

Figure 3:
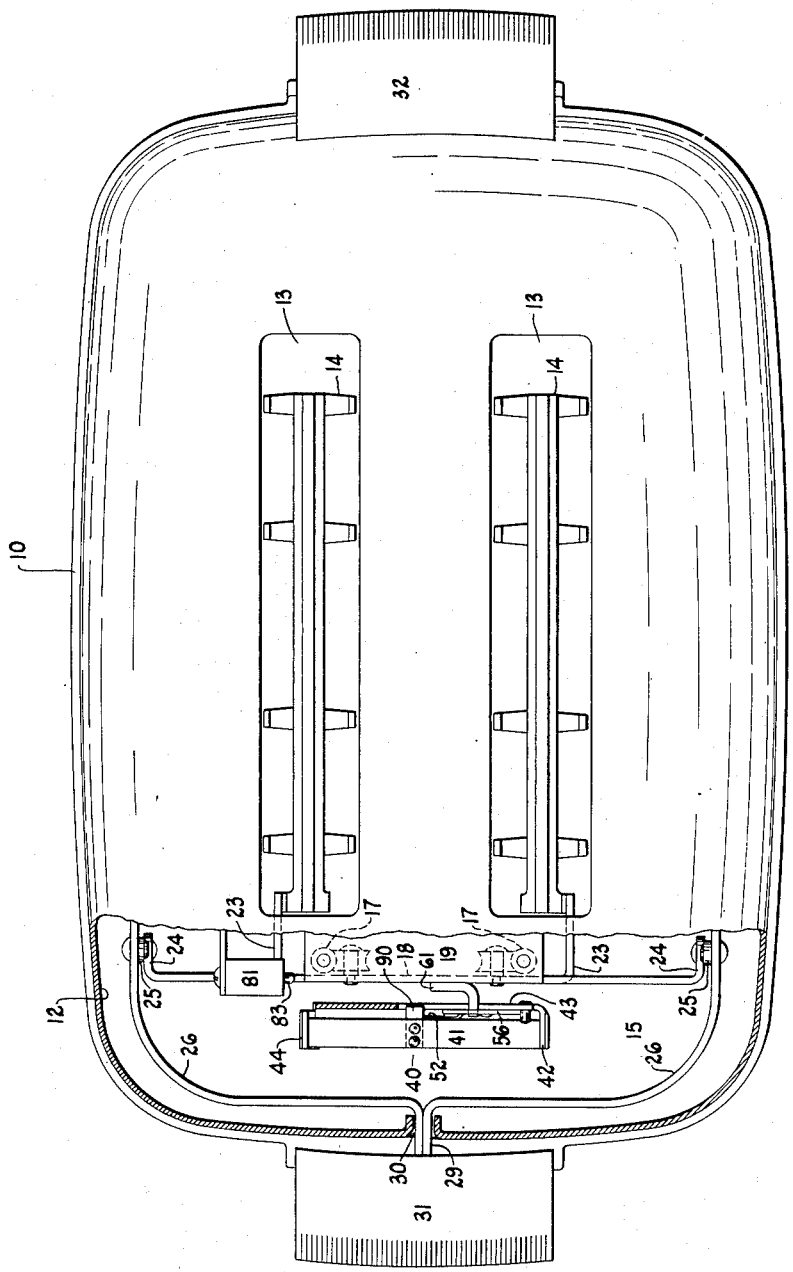
Figure 3 is a plan view of the toaster according to this invention.

Movement of the latch 56 to the position shown in Fig. 5 will move the end 58 of latch 56 to a position above the tang 90, Fig. 3, extending rearwardly from the central portion of the bimetal 41.

The bimetal 41 will then slowly cool as the toasting operation proceeds and move upwardly slowly from the position shown in Fig. 5 until it again reaches its dead center position, when it will snap to its upper bowed position of Fig. 4. This will cause the tang 90 to engage the end 58 of latch 56 and pivot it clockwise about the pin 57 so as to remove the hook 60 from above the lug 61 on carriage plate 18. The spring 24 will then move the carriage plate 18 and bread carriers 14 to their upper ejecting position causing the switch 81 to open thus deenergizing the entire toaster.

The toaster is then immediately ready for a second toasting operation since the bimetal 41 has moved to its cold position and the parts are in their original starting position as shown in Fig. 4.

Thermal timers are inherently over-compensating. That is, for the second toasting operation, the heat stored in the parts of the timer will cause the bimetal to operate much quicker than for the first operation when the entire toaster is cold. Of course, the toasting chamber is also hotter at the start of the second toasting operation, but it has been found that thermal timers still act too quickly unless some means is provided to prevent it.

According to this invention the compression spring 46 prevents over-compensation. As the parts heat up the spring 46 expands and applies more pressure to the ends of bimetal 41 so that a greater quantity of heat is required to move it from its cold position past its dead center position.

From the foregoing it can be seen that this invention provides a toaster with a simple thermal timing mechanism in which a single latch is moved to three different positions during the toasting operation. Movement of the toast carriers to toasting position first moves the lower end of the latch from a position above a portion of the bimetal, then pivots it into a position where its hooked portion overlies a portion of the carriage. Movement of the bimetal from its cold to its hot position moves the latch to a second position in which its lower end overlies a portion of the bimetal and movement of the bimetal from its hot position to its cold position moves the latch to its third or original position in which its hooked portion is removed from above a portion of the carriage to permit the carriage to move to toast ejecting position.

While I have shown but a single embodiment of my invention I do not wish to be limited to the particular structure shown and described but to include all equivalent variations thereof except as limited by the scope of the claims.

I claim:

1. A toaster comprising, a bread carriage movable from charging to toasting position and biased to charging position, a thermally responsive element movable from a first position to a second position when heated and back to its first position as it cools, heating means for said thermally responsive element, a latch mounted for pivotal and sliding movement by means of a pin and slot connection for holding said carriage in toasting position, first means actuated by movement of said carriage to toasting position for energizing said heating means to cause said thermally responsive element to move from its first to its second position, second means actuated by movement of said carriage to toasting position for first sliding said latch so that said pin moves from one end of said slot to the other and then pivoting said latch about said pin into latching position, means actuated by movement of said thermally responsive element from its first position to its second position for deenergizing said heating means to permit said thermally responsive element to cool and move from its second position back to its first position, second means actuated by movement of said thermally responsive element from its first position to its second position for sliding said latch so that said pin returns to the first end of said slot and means actuated by movement of said thermally responsive element from its second position back to its first position for pivoting said latch about said pin into releasing position.

2. A toaster comprising, a bread carriage movable from charging to toasting position and biased to charging position, a thermally responsive element movable from a first position to a second position when heated and back to its first position as it cools, heating means for said thermally responsive element, a latch mounted for sliding and pivotal movement for holding said carriage in toasting position, first means actuated by movement of said carriage to toasting position for energizing said heating means to cause said thermally responsive element to move from its first position to its second position, second means actuated by movement of said carriage to toasting position for sliding said latch from a first position to a second position and then pivoting said latch into a third position for holding said carriage in toasting position, first means actuated by movement of said thermally responsive element from its first position to its second position for deenergizing said heating means to permit said thermally responsive element to cool and return to its first position, second means actuated by movement of said thermally responsive element from its first position to its second position for sliding said latch into its second position while maintaining latching engagement with said carriage and means actuated by movement of said thermally responsive element from its second position back to its first position for moving said latch to its first position to release said carriage from toasting position.

3. A thermal timer comprising, a snap acting bimetallic element movable from a first position to a second position as it is heated and back to its first position as it cools, heating means for said bimetallic element, a lever for initiating a timed interval, said lever being spring biased to inoperative position, a latch mounted for both sliding and pivotal movement for holding said lever in operative position, first means actuated by movement of said lever to operative position for energizing said heating means to heat said bimetallic element and cause it to move from its first to its second position, second means operative upon movement of said lever to operative position to first slide said latch and then pivot it into latching position, first means actuated by movement of said bimetallic element from its first position to its second position for deenergizing said heating means to permit said bimetallic element to cool and return to its first position, and second means actuated by movement of said bimetallic element from its first position to its second position for sliding said latch into a position to be released by return movement of said bimetallic element to its first position while maintaining latching engagement between said latch and lever while said bimetallic element is cooling.

4. In an electric toaster having a base and a bread carriage movable from bread receiving to toasting position and spring-biased to bread receiving position, a lever for moving said carriage to toasting position, a latch engaging member associated with said lever, a single element latch lever including a shoulder mounted on said base for compound movement to three distinct positions in the first of which said shoulder is free of said latch engaging member to permit movement of said carrier to receiving position and in the second and third of which said shoulder engages said latch engaging member to latch said carriage in toasting position, a thermally responsive element associated with said base and movable from a cold position to a hot position when heated and back to its cold position as it cools, a heater for said thermally responsive element positioned to direct heat thereto when energized, said latch lever including means engageable by said latch engaging member upon movement of said carriage to toasting position and cooperating therewith to move said latch lever to its second position with said shoulder in engagement with said latch engaging member to latch said carriage in toasting position, switch means actuated by movement of said carriage to toasting position for energizing said heater to cause said thermally responsive element to move from its cold position to its hot position, means actuated by movement of said thermally responsive element and thereby engageable with said latch lever to move it to its third position with said shoulder in engagement with said latch engaging lever and a portion in the path of movement of said thermally responsive element and means actuated by movement of said thermally responsive element to its hot position for deenergizing said heater to permit said thermally responsive element to cool and return to its cold position and said thermally responsive element engaging said portion upon its return to its cold position for moving said latch lever to its first position with said shoulder free of said latch engaging member to permit said carriage to return to its receiving position.

5. In a toaster having a base and a bread carriage movable from said receiving position to toasting position and spring-biased to receiving position, a single element latch lever having a hooked end for engagement with said carriage mounted on said base for bodily movement to three positions in the first of which said hooked end is free of said carriage and in the second and third positions said hooked end is in engagement with said carriage to hold it in toasting position, a bimetallic thermally responsive element, a heater poistioned to heat said element, means associated with said carriage and engageable with a portion of said latch lever when said carriage is moved to toasting position and operative to shift said latch from its first position to its second position to move said hooked end to engagement with said carriage, switch means positioned to be actuated by movement of said carriage to toasting position for energizing said heater to cause said thermally responsive element to move from its cold position to its hot position, means engageable with said latch lever and actuated by movement of said thermally responsive element to its hot position and operable to shift said latch lever to its third position with said hooked end in engagement with said carriage and a portion thereof in the path of movement of said thermally responsive element, means actuated by movement of said thermally responsive element to its hot position for deenergizing said heater to permit said thermally responsive element to cool and return to its cold position to engage said portion of said latch lever and return it to its first position with said hooked end free of said carriage.

6. In a toaster having a frame and a bread carriage movable from charging to toasting position and spring-biased to charging position, a bimetallic element movable from a first position to a second position when heated and back to its first position as it cools, a heater positioned to heat said bimetallic element, a single lever latch mounted on said frame for bodily movement to first, second, and third positions, said latch lever including a first part for engaging said carriage to lock it in toasting position and a second part adapted to be positioned in the path of movement of said bimetallic element, means on said carriage engageable with said latch lever upon movement of said carriage to toasting position and operable to shift said latch lever from its first position where said first part is out of path of said carriage to its second position in which said first part engages said carriage to latch it in toasting position, means positioned to be actuated by movement of said carriage to toasting position operable to energize said heater to cause said bimetallic element to move from its first position to its second position, means actuated by movement of said bimetallic element from its first position to its second position and engageable with said latch lever to shift it from its second position where said second part is out of path of movement of said bimetallic element to its third position where said first part is in engagement with said carriage to hold it in toasting position and said second part is in the path of movement of said thermally responsive element and means actuated by movement of said bimetallic element to its second position operable to deenergize said heater and cause said bimetallic element to return to its first position and during such movement to engage said second part of said latch lever and return said latch lever to its first position.

7. In a toaster having a frame and a bread carriage movable from receiving to toasting position and biased to move to receiving position; a thermally responsive timer of the heat-up cool-off type mounted on said frame and being movable from a first position to a second position upon being heated and back to its first position upon cooling in performing its timing function; a heater carried by said frame positioned to heat said timer; a single element latch lever mounted for bodily movement on said frame and having latching means engageable with said carriage for latching it in toasting position, a leg movable into the path of movement of said thermal timer and a cam surface engageable with said carriage upon movement of the latter to toasting position; said carriage being operable upon movement thereof to toasting position to engage said cam surface and shift said latch lever from a first position in which said latching means is free of said carriage to a second position in which said latching means engages said carriage to latch it in toasting position and in which said leg is out of the path of movement of said timer, switch means positioned to be actuated by movement of said carriage to toasting position for energizing said heater to cause said timer to move from its first position to its second position; means actuated by movement of said timer to its second position and engageable with said latch lever to shift latch lever to a third position in which said latching means is in engagement with said carriage to hold it in toasting position and said leg is in the path of movement of said timer; second switch means actuatable by movement of said timer to its second position for deenergizing said heater to cause said timer to return to its first position and during such movement to engage said leg and shift said lever to its first position.

8. In a toaster having a frame and a bread carriage movable from receiving position to toasting position biased to move to receiving position; a thermal timer of the heat-up, cool-off type movable from a first position to a second position as it is heated and back to its first position as it cools to perform its timing function; a heater positioned to heat said timer; a single element latch lever mounted on said frame for bodily movement relative thereto; said latch lever including latching means engageable with said carriage for latching the latter in toasting position, cam means engageable by said carriage upon movement of the latter to toasting position, a laterally extending portion movable into the path of movement of said timer and an extended portion; said carriage being engageable with said cam means upon movement thereof toward toasting position to first shift said latch lever to condition it for movement to latching position and then to shift said latching means into latching engagement with said carriage; switch means positioned to be actuated by movement of said carriage to toasting position for energizing said heater to cause said timer to move to its second position; means actuated by movement of said timer to its second position into engagement with said extended portion of said latch lever to shift the latter so as to move the laterally extending portion thereof into the path of movement of said timer while maintaining said latching means in latching engagement with said carriage; second switch means actuated for movement of said timer to its second position for deenergizing said heater to cause said timer to return to its first position and during such movement to engage the laterally extending portion of said latch lever and shift the latter into a position in which said latching means is free of said carriage.

9. In a thermal timer of the heat-up, cool-off type; a frame; a thermally responsive element movable from a first position to a second position as it is heated and back to its first position as it cools in performing a timing function; a heater positioned to heat said thermally responsive element; lever means for initiating a timed interval and being biased to move to its inoperative position; a single element latch mounted for bodily movement on said frame for holding said lever in operative position; said latch element including latching means engageable with said lever means for holding it in operative position, cam means engageable by said lever means, and a laterally extending portion shiftable into the path of movement of said thermally responsive element; said lever means upon movement thereof to operative position being engageable with said cam means to shift said latch element to move said latch means into latching engagement with said lever means; switch means positioned to be actuated by movement of said lever means to its operative position operable to energize said heater to cause said thermally responsive element to move from its first position to its second position; means operable upon movement of said thermally responsive element to its second position and engageable with said latch element to shift the laterally extending portion thereof into the path of movement of said thermally responsive element while maintaining latching engagement between said latching means and said lever means; switch means actuated by movement of said thermally responsive element to its second position for deenergizing said heater to cause said thermally responsive element to return to its first position and during such movement to engage the laterally extending portion of said latch element to shift the latter so as to move said latch means from latching engagement with said lever means.

WILLIAM H. KITTO.

REFERENCES CITED

The following references are of record in the file of this patent:

UNITED STATES PATENTS

| Number | Name | Date |
|---|---|---|
| 2,196,393 | Ireland | Apr. 9, 1940 |
| 2,234,759 | Graham | Mar. 11, 1941 |
| 2,254,946 | Ireland | Sept. 2, 1941 |
| 2,266,045 | Ireland | Dec. 16, 1941 |
| 2,271,485 | Koci | Jan. 27, 1942 |
| 2,274,810 | Sardeson | Mar. 3, 1942 |
| 2,302,117 | Gomersall | Nov. 17, 1942 |
| 2,303,561 | Koci | Dec. 1, 1942 |